Jan. 20, 1970  F. D. DE BISSCHOP  3,490,134

METHOD OF MANUFACTURE OF A TIMING DEVICE

Filed March 24, 1967

A — UNCOIL STRIP PUNCH & REINSERT PALLETS
B — RE-COIL & TRANSPORT TO ASSEMBLY JIG
C — UNCOIL & FEED TO JIG
D — POSITION PINS
E — MOUNT LAMINATIONS
F — EJECT UNIT
G — REPEAT D, E, F

INVENTOR.
FRANK D. DE BISSCHOP
BY Fishman & Van Kirk
ATTORNEYS.

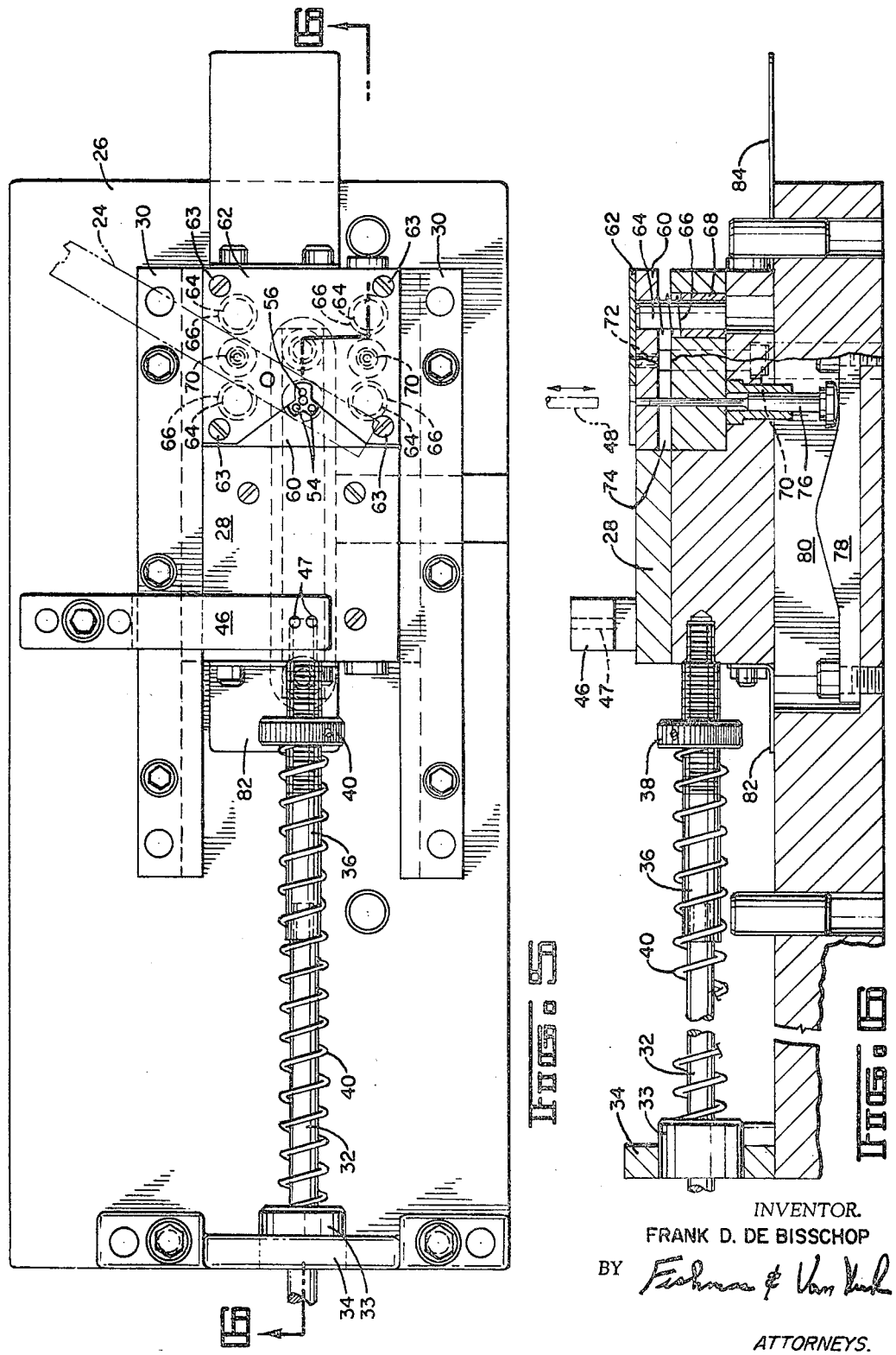

3,490,134
Patented Jan. 20, 1970

3,490,134
METHOD OF MANUFACTURE OF A TIMING DEVICE
Frank D. DeBisschop, Bantam, Conn., assignor to Thomaston Special Tool and Mfg. Co., Inc., Thomaston, Conn., a corporation of Connecticut
Filed Mar. 24, 1967, Ser. No. 625,801
Int. Cl. B23p 17/00
U.S. Cl. 29—412  9 Claims

ABSTRACT OF THE DISCLOSURE

A method of manufacturing a timing device wherein pallat laminations are punched from a strip of material, reinserted in the strip of material, and thereafter a predetermined number of the pallet laminations are extracted from the strip of material and mounted on one or more prepositioned pins in an assembly mechanism. Appropriate holes for mounting the laminations on the pins are pierced in the laminations during the punching process, and the unit of pins and mounted laminations is automatically ejected from the assembly mechanism in preparation for another cycle of operation.

BACKGROUND OF THE INVENTION

Field of the invention

This invention relates to the method of manufacturing a timing device. More particularly, this invention relates to the method of manufacturing a pallet unit in which a plurality of pallet laminations are mounted on pins. The completed pallet unit may be employed in a variety of timing devices, such as, for example, fuses and other devices wherein a minimum time delay is required in the steps of operation of the device.

Description of the prior art

The general nature of pallets and their association with and operation in timing devices are well known in the art. The particular pallet type which is made by the present invention is of the kind where a number of laminations are mounted on a pair of pins. A star toothed wheel is positioned to be in driving contact with the pair of pins, and rotation of the wheel causes the teeth to contact the pins in sequence and thus produce an oscillatory motion of the pallet unit. Since the pallet unit is thus caused to oscillate on its own mounting, a certain amount of inertia must be overcome in reversing the direction of pallet movement during the oscillations, the amount of inertia being a function of the number of pallet laminations in the unit. As a result of the inertia which must be overcome, the rate at which the pallet unit can be oscillated has an inherent limit depending on the number of laminations, and thus the rotating star toothed wheel and any element driving it have their motions constrained in the sense that a predetermined minimum amount of time must be consumed in accomplishing any particular amount of motion. The star toothed wheel is connected, as by a gear train or any other driving connection, to a moving element whose movement is to be constrained to at least a minimum time period. Since there is a mechanical connection between the element to be constrained and the pallet unit through the star toothed wheel, the element to be consrained is limited to require a predetermined minimum amount of time to accomplish a particular amount of motion.

It has heretofore been the practice in the art to primarily manually assemble the pallet unit having a plurality of pallet laminations mounted on a pair of pins. This primarily manual assembly procedure has been extremely arduous, time consuming and expensive, particularly with relatively small timing devices on the order of a size of a watch. The pallet laminations in these smaller timing units are often less than ⅜" in size and the pins on which they are mounted may often be less than ⅛" long and less than 1/32" in diameter. From this discussion of the size of the elements involved, it can be readily appreciated that the manual assembly of these elements is a difficult and painstaking task because of the obvious problems in trying to manually handle elements of these sizes on a production basis. A quality problem was also present in that the technique of manual assembly involved positioning the pins in holes in the pallet laminations and then driving the pins with a punch mechanism. The driving of the relatively small diameter pins created the exposure to problems of bent or otherwise damaged pins.

SUMMARY OF THE INVENTION

In the present invention the assembly process has been automated through employment of a novel method which has resulted in significant increases in production rates and has realized substantial cost reductions. In addition, the novel process of the present invention has reduced the quality problem through the technique of mounting the pallet laminations on prepositioned pins to thus eliminate the need to apply a driving force to the relatively fragile pins.

In the present invention the individual pallet laminations are first punched out of a blank material and then reinserted in the material. The reinserted pallet laminations are then delivered to an assembly mechanism where a predetermined number are mounted on a pair of preset pins in each cycling of the assembly method. The unit thus produced is then ejected from the assembly mechanism and a new assembly cycle takes place.

Accordingly, one object of the present invention is to provide a novel method of manufacture for a timing device.

Another object of the present invention is to provide a novel method of manufacture for a timing device whereby significant increases in production rates and substantial savings in cost are realized over prior methods of assembly.

Still another object of the present invention is to provide a novel method of manufacture for a timing device wherein the overall quality of the assembled devices is improved over the prior methods of assembly.

Other objects and advantages will be apparent from the following detailed description and drawings.

BRIEF DESCRIPTION OF THE DRAWINGS

In the drawings, wherein like elements are numbered alike in the several figures.

FIGURE 5 is a plan view of the assembly mechanism of FIGURE 4.

FIGURE 6 is a sectional elevation view taken along line 6—6 of FIGURE 5.

DESCRIPTION OF THE PREFERRED EMBODIMENT

Figure 1:
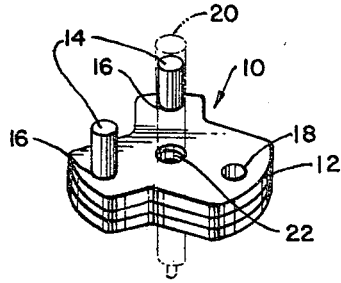
FIGURE 1 is a perspective view of a timing device assembled in accordance with the present invention.

Referring now to FIGURE 1, a timing device 10 assembled in accordance with the method of the present invention is shown. Timing device 10 includes a stack of individual three-winged pallet laminations 12, a stack of three laminations being shown in FIGURE 1.

The laminations are pinned together by a pair of pins 14, each of the pins 14 fittings with a friction or interference fit in a hole 16 in one of the wings in each pallet lamination 12. It will be understood that the pins 14 pass through mating holes in each of the pallet laminations in a stack to pin the stack together in a unit. A positioning lug 18 projects slightly above one surface of each lamination, and the opposite surface of each lamination has a corresponding recess to receive a positioning lug from another lamination. A shaft 20, shown dotted in FIGURE 1 for ease of illustration, extends through and beyond a central opening 22 in each of the pallet laminations 12. Shaft 20 is fitted into opening 22 with a friction or interference fit, and shaft 20 is eventually rotatably mounted in bearings to serve as the axis of oscillation for the timing device.

Figure 3:
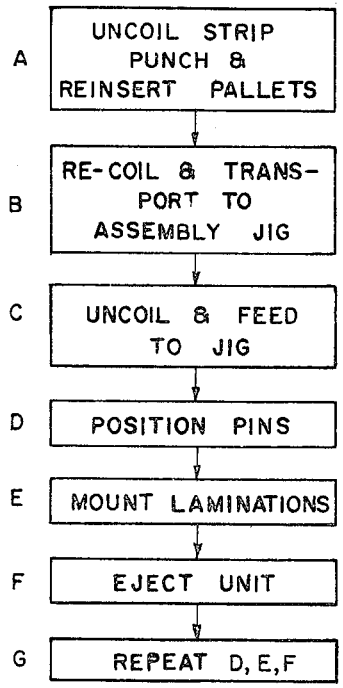
FIGURE 3 is a flow diagram depicting the steps of the method of the present invention.
Figure 2:
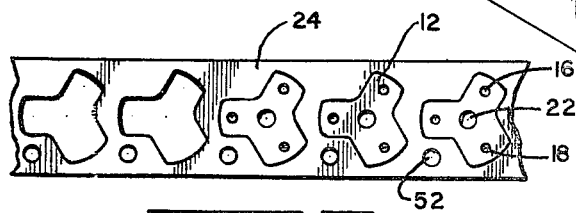
FIGURE 2 is a plan view of a strip of material with laminations punched therein.

Referring now to FIGURE 2, a strip of material 24 is shown from which the individual pallet laminations 12 are formed. Strip 24 is typically a brass material and is initially wound in a coil. The strip of material 24 is uncoiled and passed through a punch which is fitted with a known type of compound die whereby a form can be punched from the strip and then reinserted in the strip. The particular form punched in the process of this invention is, of course, the three-winged pallet laminations 12. The steps of uncoiling the strip, and the punching and reinserting the individual pallets are indicated in block A of FIGURE 3.

The strip of material 24 is recoiled after punching and reinserting the pallets, and it will be understood that the uncoiling of the strip, the punching and reinserting of the pallets, and the recoiling of the strip is a continuous operation with part of the strip being uncoiled, part being punched and reinserted, and part being recoiled simultaneously. After recoiling, the strip with the reinserted pallet laminations 12 is then delivered to an assembly jig 26 which is shown perspectively in FIGURE 4. The step of recoiling and delivering the strip to the assembly jig is indicated in step B of FIGURE 3. However, it will be understood that the recoiling of the strip is done primarily for purposes of convenience; therefore, the strip with the punched and reinserted laminations could also be delivered directly to assembly jig 26. Upon delivery to the assembly jig, the coil is then unwound and fed to the assembly jig for assembly of the timing device.

Figure 4:
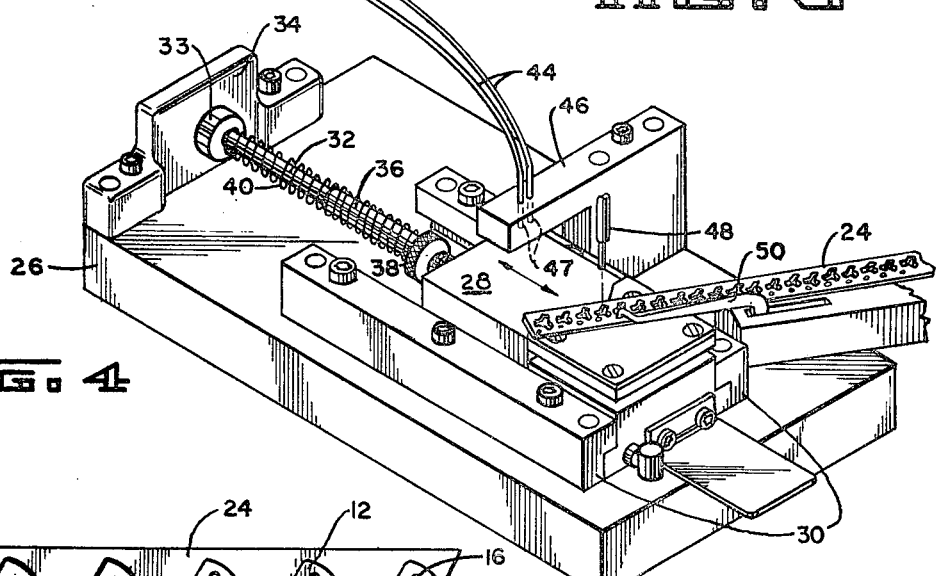
FIGURE 4 is a perspective view of an assembly mechanism for use in the method of the present invention.

Referring now to FIGURE 4, the feeding of strip 24 to the assembly jig is shown. A slide 28 is in the position shown in FIGURE 4 during the actual mounting of the pallet laminations 12 on pins 14, but slide 28 moves to the left upon completion of the assembly process to discharge the assembled device and also pick up another pair of pins for the next assembly cycle. Slide 28 is driven to the left by a conventional air cylinder (not shown), and its motion is guided by retainers 30 in which the slide is positioned. A drive shaft 32, which may be connected to the air cylinder for driving slide 28, extends through a bearing 33 in an end wall 34 and threads into rod 36 which is attached to slide 28. A spring 40 extends between the bearing 33 on end wall 34 and a spring tension adjusting nut 38 which is threaded onto rod 36. This spring returns the slide 28 rightwardly to the position shown in FIGURE 4.

A vibratory feeder 42 of any type well known in the art feeds a supply of the pins 14 through a pair of supply lines 44 which are connected to a feeder element 46. During operation, feeder 46 is always prepared to dispense a pair of the pins 14 in the vertical position through vertical passageways 47 in feeder 46. A pair of recesses (to be described more fully hereinafter) in slide 28 come into alignment with a pair of pins to be dispensed from feeder 46 when slide 28 is in its left-most position, and the pair of pins fall into these recesses to start a cycle of operation of the assembly jig. The recesses in slide 28 are spaced apart a distance equal to the space between holes 16 in a lamination 12. When slide 28 is returned to its right-most position as shown in FIGURE 4, strip 24 is positioned so that one of the pallet laminations 12 is over that portion of the slide in which the pins are now retained, and the direction of travel of strip 24 is permanently aligned so that the holes 16 of that lamination 12 are in alignment with the pins 14. With the lamination 12 in strip 24 thus positioned in alignment with the pins 14 and the recesses in slide 28, a ram 48 is then driven downwardly by an air cylinder (not shown) to strike the lamination 12 to thus extract the lamination from the strip and drive it downwardly to mount the lamination on the pins by causing engagement between the pins 14 and the holes 16. Ram 48 is then retracted, and a finger 50 is then actuated by an air cylinder (not shown) to advance strip 24 to move the next reinserted lamination into alignment with the pins in the recesses in slide 28.

Each lamination has an associated hole 52 which is pierced as part of the initial punching operation of step A. Finger 50 is spring loaded to the position shown in FIGURE 4 in which it engages a hole 52 in strip 24 associated with the particular lamination being extracted. The air cylinder lifts finger 50 upwardly and moves it back to engage the next succeeding hole 52 associated with the next succeeding lamination to be extracted. The air cylinder is then de-energized, and the spring loading on finger 50 moves it forward to thus carry with it strip 24 and thereby advance strip 24 so that the next succeeding lamination is in the position to be extracted. Ram 48 is then again energized to mount a second lamination on the pins in the recess of slide 28 so that a unit is thus created of two laminations mounted on a pair of the pins. The cycling of finger 50 can then be repeated as often as desired to mount as many laminations as may be desired for the timing unit. Assuming that three laminations are to be mounted to product the timing device shown in FIGURE 1, finger 50 would be cycled just once more to advance strip 24 to the position where one more lamination can be extracted by actuation of ram 48. After the desired number of laminations has been extracted from strip 24 and mounted on the pins, ram 48 and finger 50 are de-energized, and slide 28 is driven to the left by its air cylinder. During this leftward movement of slide 28, an ejection mechanism (to be described more fully hereinafter) is actuated to eject the timing unit from slide 28 prior to slide 28 reaching its leftmost position, and thus slide 28 is clear to receive another pair of pins in the recesses to start another cycle of operation. The positioning of the pins, the mounting of the laminations and the ejection of the unit are indicated at steps D, E and F of the flow diagram of FIGURE 3, and step G of the flow diagram indicates the repetition of steps D, E and F.

The cycling of the several air cylinders can be accomplished with any known type of timer such as a mechanical timer. The sequencing of the timer for the operation described above would be such that the cylinder driving slide 28 to the left would be pulse actuated, and then ram 48 and finger 50 would each receive three alternate actuating pulses for a complete cycle of operation, and then the cycling would repeat with the pulse again being delivered to the actuator for slide 28. Although the elements of assembly jig 26 have been described as being actuated by air cylinders, it will be understood that any other known type of actuation and cycling, such as electrical, or hydraulic, could also be employed.

Referring now to FIGURE 5, assembly jig 26 is shown in plan view. The various elements are numbered as described above in discussing FIGURE 4, and strip 24 is shown in phantom to illustrate the direction of travel of the strip with respect to slide 28. The vertical passageways 47 in feeder 46 can be seen, and the pin receiving recesses in slide 28 which have been referred to above can be seen as recesses 54 positioned below strip 24 when slide 28 is in the right-most position as shown in FIGURE 5. Another recess 56 positioned between and to the right of recesses 54 provides a receptacle for the positioning lug 18 on the first lamination 12 that is driven onto the pins. The alignment of strip 24 with respect to slide 28 is such that each lamination will be driven onto the pins in recesses 54, the lug 18 of the first lamination will drop into recess 56, and the lug 18 on each of the succeeding laminations will drop into the corresponding recess in the preceding lamination.

Recesses 54 and recess 56 are located on a spring loaded movable segment 60 which can move vertically with respect to slide 28 i.e., into and out of the plane of the paper of FIGURE 5. A cover plate 62 is positioned over movable segment 60 and is secured to segment 60 by four flat headed screws 63. Movable segment 60 is piloted on four dowels 64, each of which has a spring 66 normally holding segment 60 in the position shown in FIGURE 6.

Referring now to FIGURE 6, the assembly jig is shown in sectional elevation along lines 6—6 of FIGURE 5. It should be noted that line 6—6 is not a straight line through jig 26 but rather it is displaced after passing through the position of recess 56 so that it passes through and shows one of the dowels and springs 64 and 66, respectively.

Still referring to FIGURE 6, spring loaded segment 60 can be seen with one of the dowels 64 and one of the springs 66. The upper part of each dowel 64 has a tight fit in segment 60, and the lower part of each dowel is free to move vertically in a bushing 68. The spring associated with each dowel extends from bushing 68 to the lower part of segment 60 to spring load segment 60 upwardly. Segment 60 is retained in the assembly by a pair of stripper bolts 70 (see also FIGURE 5); the top part 72 of each stripper bolt 70 is threaded into segment 60, and the remainder of each stripper bolt is free to move vertically in passageways in the assembly. Thus, cover plate 62 is secured to segment 60 by the four flat headed screws 63; and the dowels 64, springs 66, and stripper bolts 70 cooperate to position spring loaded segment 60 with respect to the rest of the slide 28 and also retain spring loaded segment 60 in position.

The depth of recesses 54 in segment 60 is such that when the pins are positioned in recesses 54 the length of the pins extending above the upper surface of segment 60 is just equal to the thickness of the number of laminations to be mounted on the pins. Thus, in the embodiment being described, the pins would project above the upper surface of segment 60 by an amount equal to the thickness of three of the pallet laminations 12.

As can best be seen in FIGURE 6, dowels 64, springs 66 and stripper bolts 70 will combine to normally position segment 60 so that there is a separation or space 74 between segment 60 and the rest of slide 28. As ram 48 moves downward to extract a lamination 12 from strip 24 and mount the lamination on pins 14 in the recesses 54, the impact of the lamination and the ram on spring loaded segments 60 causes segment 60 to move vertically downward against the spring load of springs 66 to close space 74. When ram 48 is retracted the springs 66 return segments 60 to the position shown in FIGURE 6, and the cycle is repeated as each lamination is mounted on the pins. The movement of segment 60 as the laminations are being mounted on the pins serves a cushioning or a shock absorbing function to minimize the effects of the impact of the ram and laminations during mounting.

When three laminations have been mounted on a pair of pins, the air cylinder which powers slide 28 is actuated to drive slide 28 to the left against the force of spring 40. As slide 28 is moving to the left, an ejector element 76, which is housed within a recess 80 in slide 28, rides along the upper surface of a cam 78 and is thus moved vertically upward. The top of ejector element 76 is normally positioned a distance greater than space 74 below the surface of segment 60 so that ejector element 76 does not come into contact with the laminations during the mounting process when segment 60 is moving up and down. However, the dimensioning of ejector 76 in its housing is such that it is capable of a stroke greater than the distance of space 74, and this greater stroke is imparted to ejector element 76 as it moves along the upwardly inclined surface of cam 78. Thus, as ejector 76 reaches the midpoint of cam 78 the top of ejector 76 moves to the upper surface of segment 60, contacts the stack of laminations and then ejects the stack of laminations and the pins on which they are mounted as it completes its upward stroke to a point above the upper surface of segment 60. Ejector 76 is then retracted by the downward slope of cam 78 as slide 28 continues to move to the left past the midpoint of cam 78. Ejector 76 may be loosely positioned in its housing to accomplish the retracting movement or, if desired, it may be spring loaded against cam 78 to accomplish the retraction.

At the leftward-most point of travel of slide 28, the openings 47 in feeder 46 are aligned with recesses 54, and another pair of pins drop into the recesses for another cycle of operation. The actuating cylinder for slide 28 is then de-energized and spring 40 returns slide 28 to the position shown in FIGURES 5 and 6 for the remainder of the new cycle of operation.

It will also be observed that the recess 80 in which cam 78 is located should be protected at all times to insure that no foreign matter enters the recess. To this end, a flange 82 on the left side of slide 28 covers the left side of recess 80 when slide 28 is in its normal position as shown in FIGURES 5 and 6, and another flange 84 extending from the right side of slide 28 covers the right end of recess 80 when slide 28 is driven to the left.

Each ejected stack of laminations and pins constitutes a timing device such as shown in FIGURE 1. The timing devices are then processed for the mounting of shaft 20. To insure that each timing device is ejected clear of the assembly jig, the upper surface of ejector 76 may, if desired, be contoured to impart a desired direction of motion to the extracted timing device; or, the dimensioning could be such that the desired direction of motion is imparted as a result of extractor 76 contacting the timing device off center.

While a preferred embodiment has been shown and described, various modifications and substitutions may be made without departing from the spirit and scope of this invention. Accordingly, it is to be understood that this invention has been described by way of illustration rather than limitation.

What is claimed is:
1. In the method of manufacturing a multielement pallet device, the steps of:
feeding a strip of material to a punch, said material being initially wound in a coil;
repeatedly punching a predetermined form from said strip to produce a plurality of elements of the predetermined form, each of said elements having at least one opening therein for location of a pin;
reinserting said elements in said strip of material to produce a modified strip of material having said elements held therein;
recoiling said strip to form a coil of said modified material;
delivering said modified coil of material to an assembly mechanism;
repeatedly positioning at least one pin in said assembly mechanism;
feeding said strip of modified material to said assembly mechanism from said modified coil;
serially positioning said elements in said strip with said one opening in the element aligned with said pin;
extracting at least one of said positioned elements from said strip and mounting said extracted element on said pin to form a unit; and removing said unit from said assembly mechanism.

2. The method of manufacturing a multielement pallet device as in claim 1 wherein the step of extracting each of said positioned elements includes:

punching said positioned element out of said modified strip and driving said positioned element on to said pin to form a unit of three of said elements.

3. The method of manufacturing a multielement pallet device as in claim 1 wherein:

each of said elements has at least two openings therein for the location of pins; and wherein two pins are serially positioned in said assembly mechanism and said elements in said strip are serially positioned with said openings therein aligned with said pins; and wherein said extracted element is mounted on said two pins to form said unit.

4. The method of manufacturing a multielement pallet device as in claim 3 including the step of:

serially extracting a second and third of said serially positioned elements and mounting said second and third extracted elements on said pins.

5. The method of manufacturing a multielement pallet device as in claim 4 wherein:

another two pins are positioned in said assembly mechanism after removal of said each unit.

6. The method of manufacturing a multielement pallet device as in claim 5 wherein the step of serially extracting said positioned elements includes:

punching each of said serially positioned elements out of said modified strip and driving each of said serially positioned elements on to said pins.

7. The method of manufacturing a multielement pallet device as in claim 4 wherein the step of punching a predetermined form from said strip includes creating an opposed positioning lug and positioning depression on each of said elements.

8. The method of manufacturing a multielement pallet device as in claim 4 wherein the step of removing said unit from said assembly mechanism includes ejecting said unit from said assembly mechanism.

9. The method of manufacturing a multielement pallet device as in claim 4 wherein:

each of said units forms a pallet lever, each of said elements being a lamination for a pallet lever; and including the step of mounting said pallet lever on a shaft.

References Cited

UNITED STATES PATENTS

| | | | |
|---|---|---|---|
| 1,019,919 | 3/1912 | Richer | 29—412 |
| 1,161,191 | 11/1915 | Cook. | |
| 1,434,857 | 11/1922 | Sunback. | |
| 2,260,899 | 10/1941 | Heftler | 29—433 |

JOHN F. CAMPBELL, Primary Examiner

D. C. REILEY, Assistant Examiner

U.S. Cl. X.R.

29—432, 433